(12) United States Patent
Jiang

(10) Patent No.: US 8,070,876 B1
(45) Date of Patent: Dec. 6, 2011

(54) FIREPROOF INSULATING CEMENTITIOUS FOAM COMPRISING PHASE CHANGE MATERIALS

(76) Inventor: Haihong Jiang, Shelby Township, MI (US)

( * ) Notice: Subject to any disclaimer, the term of this patent is extended or adjusted under 35 U.S.C. 154(b) by 0 days.

(21) Appl. No.: 13/101,343

(22) Filed: May 5, 2011

(51) Int. Cl.
*C04B 14/40* (2006.01)

(52) U.S. Cl. ........ 106/700; 106/638; 106/645; 106/646; 106/819; 106/821; 428/402.21; 428/402.22; 428/402.24

(58) Field of Classification Search .............. 106/700
See application file for complete search history.

(56) References Cited

U.S. PATENT DOCUMENTS

| | | | | |
|---|---|---|---|---|
| 2,855,374 | A | * | 10/1958 | Winkler et al. ............ 524/300 |
| 2,986,544 | A | * | 5/1961 | Driscoll .................... 524/524 |
| 3,758,319 | A | * | 9/1973 | Ergene ..................... 106/646 |
| 3,775,351 | A | * | 11/1973 | Sachs ....................... 106/122 |
| 3,989,534 | A | | 11/1976 | Plunguian et al. |
| 4,240,839 | A | | 12/1980 | Crepeau et al. |
| 4,265,964 | A | | 5/1981 | Burkhart |
| 4,277,357 | A | * | 7/1981 | Boardman ................... 252/70 |
| 4,303,450 | A | | 12/1981 | Hacker |
| 4,310,996 | A | | 1/1982 | Mulvey et al. |
| 4,518,652 | A | * | 5/1985 | Willoughby ............. 428/312.4 |
| 4,587,279 | A | | 5/1986 | Salyer et al. |
| 4,747,240 | A | | 5/1988 | Voisinet et al. |
| 4,797,160 | A | | 1/1989 | Salyer |
| 4,917,802 | A | * | 4/1990 | Fukaya et al. ............. 423/331 |
| 4,988,543 | A | | 1/1991 | Houle et al. |
| 5,202,150 | A | | 4/1993 | Benson et al. |
| 5,401,538 | A | | 3/1995 | Perito |
| 5,529,624 | A | | 6/1996 | Riegler |
| 5,755,216 | A | | 5/1998 | Salyer |
| 5,788,912 | A | | 8/1998 | Salyer |
| 6,241,815 | B1 | | 6/2001 | Bonen |

(Continued)

FOREIGN PATENT DOCUMENTS

BE 842976 A * 10/1976

(Continued)

OTHER PUBLICATIONS

Kovler, K., "Setting and Hardening of Gypsum-Portland Cement-Silica Fume Blends, Part I: Temperature and Setting Expansion," Cement and Concrete Research, Elsevier Science Ltd., vol. 28, No. 3, pp. 423-437 (1998).

*Primary Examiner* — Jerry Lorengo
*Assistant Examiner* — Ross J Christie

(57) ABSTRACT

A fireproof insulating foamed cementitious composition with thermal energy storage capacity is provided for use in producing wall insulation boards, fireproof claddings for steel structures, inner cores of fire resistant wall or door panels, and the like. The composition demonstrates improved energy efficiency in which phase change materials, such as microencapsulates, are used in conjunction with a cementitious mixture of calcined gypsum and hydraulic cement, lightweight aggregates, a polymer latex, and a foaming solution to create stable air bubbles inside the cementitious matrix. The calcined gypsum and the hydraulic cement are present in a weight ratio range from about 1:3 to about 3:1. The composition may further include reinforced fibers, surfactants, inorganic flame retardants, and other additives. The presence of the phase change material not only increases energy efficiency of the cured cementitious foam material, but also improves compatibility between calcined gypsum and cement during slurry mixing and hardening.

16 Claims, 2 Drawing Sheets

U.S. PATENT DOCUMENTS

| | | |
|---|---|---|
| 6,290,769 B1 | 9/2001 | Carkner |
| 6,602,924 B1 | 8/2003 | Chiang et al. |
| 7,166,355 B2 | 1/2007 | Jahns et al. |
| 2008/0118735 A1* | 5/2008 | Kanao .................. 428/294.7 |
| 2008/0168927 A1* | 7/2008 | Roberts .................. 106/731 |
| 2009/0032252 A1* | 2/2009 | Boney et al. ............. 166/280.2 |
| 2009/0090276 A1* | 4/2009 | Feng et al. ............... 106/640 |
| 2009/0094994 A1* | 4/2009 | Willcoxen et al. ............ 62/62 |
| 2009/0169812 A1* | 7/2009 | Fan et al. .................. 428/141 |
| 2010/0034978 A1* | 2/2010 | Garuti et al. ............. 106/15.05 |
| 2010/0310850 A1* | 12/2010 | Porter et al. ............. 428/294.7 |
| 2011/0064997 A1* | 3/2011 | Peskar et al. ............... 429/185 |

FOREIGN PATENT DOCUMENTS

| | | | |
|---|---|---|---|
| CN | 101353265 A | * | 1/2009 |
| CN | 101813361 A | * | 8/2010 |
| EP | 1983014 A2 | * | 10/2008 |
| JP | 04153089 A | * | 5/1992 |
| JP | 2002097049 A | * | 4/2002 |
| RU | 2029754 C1 | * | 2/1995 |
| RU | 2386658 C1 | * | 4/2010 |
| RU | 2389700 C1 | * | 5/2010 |
| WO | WO 2007110661 A1 | * | 10/2007 |

* cited by examiner

FIREPROOF INSULATING CEMENTITIOUS FOAM COMPRISING PHASE CHANGE MATERIALS

FIELD OF THE INVENTION

This invention relates to fireproofing and thermal insulation materials with improved energy efficiency, and more particularly to foamed cementitious compositions containing phase change materials which have dynamic thermal energy-storage properties.

BACKGROUND OF THE INVENTION

Petroleum-based plastic foam materials, such as Styrofoam, polyurethane foam, and phenolic foam have been used for thermal insulation of commercial and industrial building structures. However, such foams exhibit limited fire resistance even after fire-retardant treatments. When exposed to high temperature flame, plastic foams undergo repaid thermal degradation and decomposition along with the emission of hazardous fumes and smoke.

Fiberglass and mineral wool insulations have found extensive application for residential housing in North America. These inorganic fibers offer better fire protection than petroleum-based foams. But flexibility and "fluffy" nature of such fiber insulations make them hard to retain fasteners, bolts and any other hardware resulting in more difficult and expensive construction and installation for applications, such as exterior wall insulation.

There has been a long-recognized need for rigid thermal insulation materials with good fire resistance and mechanical strength. U.S. Pat. No. 4,240,839 to Crepeau et al. discloses an insulating assembly comprising a low density foamed gypsum material and entrainment air. This gypsum foam has been further reinforced with cement and mineral wool as described in U.S. Pat. No. 4,310,996 to Mulvey et al. But mechanical strength of such foamed gypsum is still unsatisfactory and it needs to be protected by structural surface elements.

U.S. Pat. No. 4,265,964 to Burkhart points out that entrainment of air alone will not create a gypsum wallboard with sufficiently low density, and meanwhile, maintain adequate strength. Among ingredients for lightweight gypsum compositions disclosed in this patent, thermoplastic granules have been introduced to balance lightweight requirement and strength reduction. A rubbery polymeric latex is also used for adding strength, integrity and flexibility to the final gypsum structural units. U.S. Pat. No. 6,602,924 to Chiang et al. discloses a foamed gypsum formulation containing mainly gypsum, foaming agents, epoxy resin and a hardener.

U.S. Pat. No. 3,989,534 to Plunguian et al. discloses a cellular product comprised of mineral cement, a film former, surfactants, lightweight aggregates, and excessive amount of air. U.S. Pat. No. 4,303,450 to Hacker discloses a sprayable insulation composition containing Portland cement, lime, diatomite and a water-soluble foaming agent. U.S. Pat. No. 5,529,624 to Riegler describes a fire retardant insulation material produced from a perlite and zeolite mixture bound together by cement and lime without an air-entraining or foaming process.

Foamed gypsum materials, compared to foamed cement, offer advantages of fast setting, early hardening, high early strength, and better fire protection and thermal insulation abilities. However, gypsum is sensitive to water and limited to interior applications if without any waterproofing treatment. On the other hand, foamed cement demonstrates good water resistance, environmental durability and strong mechanical strength, but also exhibits a long set time which results in long lead time. This could be a significant disadvantage and have a negative impact on productivity and capacity, especially when there are further processing steps needed to be done after cement hardening and setting.

Adding a large percentage of calcined gypsum (calcium sulfate hemihydrates) into Portland cement is usually unfeasible because of the formation of ettringite and thaumasite, which may cause expansion and performance deterioration. Some "pozzolanic" materials, such as silica fume, metakaolin, and furnace slag et al., have been tried in gypsum-cement systems to prevent the deleterious effect of ettringite and thaumasite. Pozzolanic activities of silica fume have been discussed by Kovler in his article published in Cement and Concrete Research, Vol. 28, No. 3, pp. 423-437, 1998. U.S. Pat. No. 6,241,815 to Bonen discloses a gypsum-cement system with good water durability, which contains pozzolanic materials to minimize the formation of ettringite and thaumasite. U.S. Pat. No. 5,401,538 to Perito discloses sprayable cement-based fireproofing compositions mainly comprised of Portland cement, a high density aggregate, gypsum stucco, a stucco set retarder and shredded polystyrene aggregate. Densities of the resulted materials are quite high. U.S. Pat. No. 6,290,769 to Carkner discloses a lightweight insulating mixture of Portland cement, plaster of Paris (calcium sulfate hemihydrates), terra alba (calcium sulfate dihydrate) and lightweight aggregates. Above prior-art patents have explored opportunities to combine the advantages of both gypsum and cement. However, none of them has also focused on achieving good thermal insulating properties and energy efficiency.

Phase change materials (PCM) have drawn a lot of interest from architectural and building industries where energy consumption for indoor climate control is becoming one of the major considerations for residential and commercial building design and operation. A phase change material utilizes latent heat of fusion for thermal storage at its melting/freezing point. During solid-liquid phase transitions, phase change materials absorb and release large amounts of heat energy without a change in temperature. Based on this unique function, phase change materials can be incorporated into building component to assist in maintaining interior temperature within a comfort range and saving gas or electrical energy. For example, in summer months, building elements containing phase change materials absorb solar energy and prevent solar heat from directly penetrating into the interior of a room. As a result, the interior temperature can be kept cool for a longer time and the workloads of air conditioning system can be alleviated. In winter months, the phase change materials stop the interior heat generated by indoor heaters or a house furnace dispersing into the cold exterior environment. They absorb and store the heat energy through solid to liquid phase transition, then, release the energy back to the interior when the room temperature drops below their inching points, which leads to a significant reduction in electricity and natural gas consumption.

U.S. Pat. No. 4,587,279 and U.S. Pat. No. 4,797,160 to Salyer et al. disclose cementitious building materials directly incorporated with phase change materials. Later, U.S. Pat. No. 5,755,216 to Salyer points out that direct adding phase change materials into cementitious compositions can cause significant reductions in mechanical strength of the final products. In order to avoid this negative impact, phase change materials have been impregnated into finished building products after manufacturing. U.S. Pat. No. 4,988,543 to Houle et al. discloses a method and an apparatus for spraying a phase change material on one side of gypsum wallboards. The impregnation of phase change materials into porous products can be enhanced by exposure to microwave energy as described in U.S. Pat. No. 5,202,150 to Benson et al. However, post-manufacturing impregnation creates building products with high surface phase change material concentrations. Because most phase change materials are flammable, impregnated products need extra flame retardant treatments. U.S. Pat. No. 5,788,912 to Salyer discloses a method of treating porous product surfaces containing phase change materials with a urea fire-retarding agent. U.S. Pat. No. 5,755,216 to Salyer discloses a method of inserting phase change material-containing composites into hollow cores of cementitious building blocks. In addition, unencapsulated phase change materials, when in liquid state, could flow away from their original positions, so it is better to seal them inside of small capsules before being added into the cementitious matrix. U.S. Pat. No. 4,747,240 to Walter et al. discloses phase change capsules incorporated into building materials like a fine aggregate. U.S. Pat. No. 7,166,355 to Jahns et al. teaches the use of microencapsulated phase change materials in gypsum plasterboard compositions.

SUMMARY OF THE INVENTION

It is the object of the present invention to provide a fireproofing, insulating cementitious foam composition with thermal energy storage capacity, improved energy efficiency, water resistance and fast setting ability. The resulting thermal energy storage cementitious foam material can be used to, but not limited to, produce insulation layers for interior or exterior walls of buildings, fireproof cladding for steel structures, inner cores of fire resistant walls, roof or door panels, and lightweight fire barriers for subways and tunnels.

Accordingly the thermal energy storage foamed cementitious compositions are produced from (a) a cementitious binder mixture of calcined gypsum, such as calcium sulfate hemihydrates, and hydraulic cement, such as Portland cement, in an amount of about 30-80 wt %; (b) a phase change material, preferably a microencapsulated phase change material, in an amount of up to 30 wt %; (c) lightweight aggregates, such as polystyrene foam beads, expanded perlite, and wood four or sawdust, in an amount of about 0.5-30 wt %; (d) a polymer latex, in an amount of about 0.5-15 wt %; and (e) a foaming solution, in an amount of about 0.5-25 wt %, to create stable air bubbles inside the cementitious matrix. The calcined gypsum and the hydraulic cement are present in the cementitious binder mixture in a ratio range from about 1:3 to about 3:1 by weight.

Many embodiments of the invention further comprise one or more of the following ingredients: fiber reinforcements, such as fiberglass, in an amount of about 0.2-5 wt %; a nonionic or anionic surfactant, in an amount of about 0.05-0.3 wt %; and an inorganic flame retardant, in an amount of up to about 15 wt %. Other additives, such as gypsum retarders, water reducers, antifreeze, and antibacterial agents are also used in some embodiments of the invention.

Cured energy storage cementitious foam materials of the present invention demonstrate excellent fire and high temperature resistance. They can be exposed to 800-1000° C. (1472-1832° F.) natural gas flame for about 3 hours without losing structural integrity, whereas petroleum-based synthetic foams usually experience severe structural decomposition and even completely disappear within a few minutes.

The energy storage cementitious foam materials of the present invention also exhibit good thermal insulation property and improved energy efficiency. In some embodiments, thermal conductivities of the inventive materials are around 0.05-0.07 W/(m·K) in comparison with about 0.04 W/(m·K) of most synthetic insulating foams. A nearly 100% improvement on temperature-holding ability can be achieved by adding about 6 wt % of microencapsulated phase change materials. Furthermore, it is unexpected that the addition of the phase change materials makes it feasible to blend a large amount of calcined gypsum into a cement system. The presence of the phase change material improves compatibility between gypsum and cement without help of any pozzolanic materials, and creates a more stable gypsum-cement blending system, leading to a significant increase in mechanical strength.

The inventive materials show fast-setting and high early strength characters of gypsum. Sufficient strength for shipping and handling can be built within about 3-5 hours, which provides opportunities for high volume, fast production and lead time reduction. In the meantime, the cement in the compositions contributes to the development of strong final mechanical strength, and water resistance which is further enhanced by the presence of waterproofing polymers in the cured materials.

In some embodiments of the present invention, only a minimum amount of water is used to produce flowable and pumpable slurries. No excessive water is added over the amount needed for hydration reactions of the cementitious binder mixture. Thus high energy-consuming and expensive water drying process can be eliminated. In addition, unlike loose-fill cellulose and fiberglass insulations, the inventive materials offer acceptable nail and faster pullout resistance, especially when a small amount of wood flour or other natural fibers are present in the compositions.

DETAILED DESCRIPTION OF THE INVENTION

Figure 1:
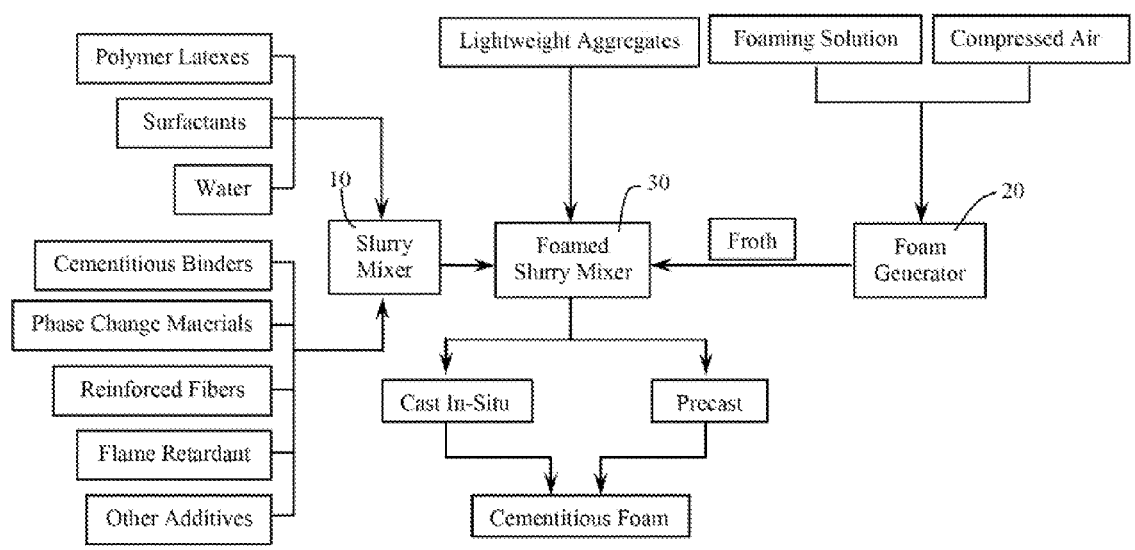
FIG. 1 is a flowchart of a preferred process for producing energy storage and fireproof cementitious foam of the present invention.

The energy storage and fireproofing foamed cementitious compositions comprise a cemetitious binder mixture, an energy storage phase change material, lightweight aggregates, a polymer latex, and a foaming solution. Some embodiments of the invention further include reinforced fibers, surfactants, inorganic flame retardants, and optionally other additives, such as gypsum retarders, and water reducers. In one embodiment, a cured product of the present invention may be described as a rigid porous material system in which lightweight aggregates and energy storage materials homogeneously dispersed in a fiber-reinforced, polymer-modified cementitious foam matrix.

The cementitious binder mixture of calcined gypsum and hydraulic cement provides fire resistance and acts as a primary binder for other major ingredients, such as, phase change materials and lightweight aggregates.

Calcined gypsum refers to a group of settable gypsum materials, most typically, calcium sulfate hemihydrate ($CaSO_4 \cdot \frac{1}{2}H_2O$), commonly known as plaster of Paris which is produced by heating natural gypsum (calcium sulfate dihydrate, $CaSO_4 \cdot 2H_2O$) to about 150° C. (302° F.). When mixed with water, hemihydrate reverts chemically and sets quickly to form the rigid calcium sulfate dihydrate (gypsum). Both alpha and beta crystalline forms of the hemihydrate are suitable ingredients for the cementitious mixture of the present invention.

Hydraulic cement, such as Portland cement, calcium aluminate cement, or expansive cement, can react with water through hydration to form a hard, non-water soluble product. The hydration and setting reactions of hydraulic cements can happen in wet weather and even underwater. In accordance with the embodiments of the present invention, Portland cement is especially preferred, and it is mainly composed of tricalcium silicate ($3CaO.SiO_2$), dicalcium silicate ($2CaO.SiO_2$), tricalcium aluminate ($3CaO.Al_2O_3$), and tetracalcium aluminoferrite ($4CaO.Al_2O_3.Fe_2O_3$). Portland cement is made by grinding "clinker" with a small amount of gypsum into a fine powder. The "clinker" is basically a high temperature calcination product of limestone (calcium carbonate) and clay (aluminium silicate). ASTM C150 Types I to V, and Types IP, IS, and C are suitable Portland cement grades for the embodiments of the present invention. Types I, II, III and V are preferred.

Typically, the amount of the cementitious binder mixture in the total composition ranges from about 30-80 wt %. The cementitious mixture is further comprised of 20-70 wt % calcined gypsum, and 30-80 wt % hydraulic cement. The calcined gypsum and the hydraulic cement are present in weight ratios from about 1:3 to 3:1, preferably, from about 1:2 to 2:1.

In some embodiment examples, for the sake of comparison, optionally, a proportion of calcined gypsum and hydraulic cement in the cementitious binder mixture may be replaced by hydrated lime (calcium hydroxide, $Ca(OH)_2$), in an amount of less than 8 wt %, and a pozzolanic material in an amount of up to 20 wt %. Defined by ASTM C618, pozzolanic materials, or pozzolans are siliceous or aluminosiliceous materials which only exhibit cementitious binding properties in the presence of calcium hydroxide. Commonly used pozzolans include fly ash, silica fume, metakaolin, ground granulated blast furnace slag. Adding finely pulverized pozzolanic materials into gypsum-Portland cement system may minimize the deleterious effect of ettringite and thaumasite which are formed by gypsum-cement reactions. However, due to the very small particle size of the pozzolans, more water will be needed to form flowable and pumpable slurries, which is not desirable for drying-free formulations.

Suitable phase change materials for use in the present invention are latent heat storage materials which have a solid-liquid phase transition temperature in the range from −30 to 150° C. (−22 to 302° F.). Typically, these phase change substances include salt hydrates, aliphatic, aromatic and halogenated hydrocarbons, fatty acids, fatty alcohols, fatty amines, stearic acid esters, natural and synthetic waxes, and eutectic mixtures. For the purposes of indoor climate control and energy saving in building and construction applications, crystalline aliphatic hydrocarbons, stearic acid esters, paraffin waxes, and their blends with a melting point of 15 to 35° C. (59 to 95° F.) are particularly preferred. Either a single or a combination of phase change materials with different phase transition temperatures (melting points) can be utilized. Commercially available products of such phase change materials include butyl stearate with the melting point at about 23° C. (73° F.) available from Specialty Industrial Product, Inc., octadecane and Fluka-dodecanol from Sigma-Aldrich which change phase in a temperature range from about 22-28° C. (72-82° F.), etc.

Preferably, the phase change materials used in the present invention are macroencapsulatd or microencapsulated inside polymeric shells. They can also be impregnated or absorbed into the pores of porous materials or absorptive fillers, such as foamed concrete, expanded graphite, or silicon dioxide, and then ground into small particles. Microencapsulated phase change particles with thermosetting polymeric capsule shells are especially preferred. Examples of suitable thermoset and crosslinked shell wall materials are urea-formaldehyde resins, phenol-formaldehyde resins, melamine-formaldehyde resins, polyureas, polyurethanes, and acrylic polymers. A number of such microencapsulated phase change materials are commercially available under specific designations and trademarks, such as Phase-Cap from Capsulated Systems Inc., Thermocules from Outlast Technologies, Micronal® PCM from BASF, FS® PCM and MPCM® from Microtek Laboratories, Inc. Generally, these microencapsulates contain about 50-95 wt % phase change materials inside capsule cores, and about 5-50 wt % polymeric capsule shells. The mean particle size of microencapsulated phase change materials is in the range of 1-80 µm, preferably, 5-35 µm.

A single type or a combination of phase change materials is added to the foamed cementitious insulating compositions in an amount of up to 30 wt % depending on energy efficiency design requirements. Although microencapsulated phase change materials are not considered as pozzolans, it has been unexpectedly found in the experiments of the present invention that the addition of microencapsulated phased change materials helps to build a more stable calcined gypsum-cement blending system which results in the formation of a foamed cementitious product with significantly increased mechanical strength.

In accordance with the present invention, the energy storage insulating cementitious foam comprises about 0.5-30 wt % lightweight aggregates. Lightweight aggregates refer to any low density concrete aggregates which have thermal conductivities less than 0.12 W/(m·K). Preferences are given to plastic foam particles, especially polystyrene foam beads with thermal conductivity of 0.04-0.05 W/(m·K), and expanded perlite which has a thermal conductivity of about 0.05-0.07 W/(m·K). Polystyrene foam beads are fully expanded foam granules which have a mean particle size of 0.2-5 mm, and a density in the range of 0.1-5 pcf (pounds per cubic foot) (1.6-80 kg/m$^3$). The surface of the foam beads may be pretreated with flame retardants or/and coupling agents to improve fire resistance and adhesion between foam beads and the polymer modified cementitious matrix. Acceptable expanded perlite for the present invention is produced by heating perlite minerals, a type of volcanic glass, to about 850-900° C. (1562-1652° F.), and combined water evaporation which causes considerably larger volume expansion of the original material. The suitable expanded perlite will have a particle size of 0.1-5 mm, and a density from 1-10 pcf (16-160 kg/m$^3$). Wood flour or sawdust may also be utilized in the present invention, in an amount of less than 20 wt %, to increase nail and fastener pullout resistance. Pine, maple, and oak are preferred wood species. Acceptable wood flour will have a particle size of 20-120 mesh (0.15-0.85 mm), and a density less than 15.6 pcf (250 kg/m$^3$).

Polymer latexes or emulsions have been found to be beneficial in the present invention. Water resistance of the final product has been improved by the formation of a thin layer of water-insoluble polymer dry film on the surfaces of the cementitious components, especially gypsum. Meanwhile, polymer latexes act as organic binders to provide better adhesion and compatibility between lightweight aggregates and cementitious matrix. Examples of suitable polymer latexes include nitrile butadiene, acrylonitrile butadiene, poly(chlorobutadiene), polyvinyl chloride, polyvinyl acetate, ethylenevinyl acetate, polyvinyl alcohol, acrylates, urethanes, epoxy, and silicones. Water-based acrylic latexes and epoxy emulsions are especially preferred. Generally, the polymer latexes/emulsions used contain about 40-80 wt % polymers and 20-60 wt % water. Polymer latexes are present in an amount of about 0.5-15 wt % of the total composition. When an epoxy emulsion is selected, a corresponding cross-linking agent may also be used in an amount of 10-50 wt % of the epoxy emulsion.

Foaming the cementitious mixture slurry will reduce the weight and improve thermal insulation property of the matrix. This can be achieved by entraining small stable air bubbles into the slurry of the cementitious mixture. Preferably, in accordance with the present invention, a continuous flow of froth, with a density between 0.5-8 pcf (8-128 kg/m$^3$), is introduced into the cementitious slurry until the foam content increases to about 0.5-25 wt % of the total composition. The froth flow is generated by sending a foaming solution and compressed air into a foam generator. The foaming solution is comprised of a foaming agent, in an amount of 0.05-10 wt %, the polymer latex, in an amount of 0.02-1.5 wt %, and water. A small amount of a foam stabilizer, such as protein colloids and glycols, may also be added. Acceptable foaming agents are polyoxyethylene alkyl ethers, alkanol sulfates (such as sodium lauryl sulfate), alkyl or aryl sulfonates (such as sodium phenyl sulfonate), sodium/potassium salts of fatty acid, and proteins. The air bubble size of the foam can be adjusted according to the type of the foaming agent and its concentration in the foaming solution, as well as the flow rate of compressed air supply. Preferred air bubble diameter is in the range of 0.05-2 mm.

Optionally, it is desirable that the foamed cementitious matrix is reinforced by various organic or inorganic fibers, such as fiberglass, polyester, polypropylene or nylon fibers, cellulose fibers, flax, kenaf, and hemp. Among them, chopped short fiberglass, polypropylene and cellulose fibers with a fiber length of 5-50 mm are especially preferred. The amount of reinforced fibers in the total composition is typically about 0.2-5 wt %. The outer surfaces of the final product may also be reinforced by fiberglass scrim fabrics.

In some embodiments, adding one or more surfactants increases the wettability of the cementitious slurry to the lightweight aggregates. This leads to the formation of a homogeneous dispersion of the lightweight aggregates in the cementitious matrix without aggregate separation. Meanwhile, surfactants also create a more uniform foam cell distribution inside the cementitious slurry matrix. Examples of the acceptable surfactants include nonionic surfactants, such as alcohol ethoxylate, decyl glucoside, dodecyldimethylamine oxide, and anionic surfactants, such as alkyl sulfonates, perfluorosulfonate, or lauroyl sodium sarcosinate. Surfactants are used in an amount of about 0.05-0.3 wt % of the total composition.

An inorganic flame retardant, such as aluminum trihydrate, magnesium hydroxide, and borates, may also be utilized, in an amount of up to 15 wt %, to provide enhanced fire resistance. Dehydration temperatures of such flame retardants, typically 230-430° C. (446-806° F.), are higher than the dehydration temperatures of gypsum (150-170° C., 302-338° F.), but lower than the temperature of 500° C. (932° F.) at which a major loss in strength occurs in cement. The presence of the inorganic flame retardant helps to maintain the mechanical strength of the final products under prolonged high-temperature exposure.

Theoretically, only 18 parts of water will be required for the hydration reaction of 100 parts of calcined gypsum (hemihydrate). However, a relatively large amount of extra water has to be added in order to provide appropriate flowability and workability to the slurry. During the final stage of the process, the excess water needs to be evaporated to give the cured product desired mechanical strength. Energy consumption and operating costs of this drying procedure are considerably high. One of the advantages of designing calcined gypsum-cement blending compositions is that the extra water for the calcined gypsum can be directly consumed by the cement without losing appropriate flowability, workability, and sacrificing fast-setting and early hardening capacities of hemihydrates. In some embodiments of the present invention, the water usage in the compositions can be carefully adjusted so that the drying stage can be totally eliminated. The water in the latex and the foaming solution should also be considered as effective water sources. The total water content should be maintained within 8-50 wt %, preferably, 12-40 wt % of the whole composition.

Other additives, including gypsum retarders, such as borax, citric acid or sodium tripolyphosphate, water reducers, such as lignosulfonates, or melamine superplasticizer, antifreeze, and antibacterial agents may also be utilized in some of the embodiments of the present invention.

FIG. 1 shows a simplified flowchart of a preferred process for making the energy storage cementitious foam of the present invention. Calcined gypsum and hydraulic cement are blended together to form the cementitious binder mixture which is then further mixed with the phase change materials, and optionally, reinforced fibers, flame retardant, and other solid additives, such as water reducing agents, to produce a dry blend. Suitable amounts of the polymer latexes, water, and sometime along with the surfactants, are put into a slurry mixer 10, and then the dry blend is slowly added to the mixer 10 under agitation at medium speeds to form a homogeneous slurry. Meanwhile, the foaming agent is mixed with water, a small amount of the latex, and optionally, a foam stabilizer to prepare the foaming solution with appropriate concentration. The foaming solution is then sent to a foam generator 20 where it is combined with compressed air to create stable air bubble froth. The bubble size and the density of the foam froth can be adjusted to the desired ranges. The slurry in the mixer 10 is transferred into a foamed slurry mixer 30 which has been pre-filled with appropriate amounts of the lightweight aggregates. The slurry and the lightweight aggregates are mixed together in the mixer 30 under mild agitation. After a good dispersion of the lightweight aggregates is formed, the foam generator 20 is started, and a continuous foam flow is introduced into the mixer 30. The foam generator 20 will be stopped when the required amount of the foam has been added into the mixer 30. The mixer 30 will continue to run at a mild agitation speed until a homogeneous foamed slurry, preferably with a wet density of 3-38 pcf (48-608 kg/m$^3$), is produced. Finally, the foamed slurry can be pumped out to make cast in-situ building elements, such as fire barrier wall or steel structure fireproofing assemblies. It can also be discharged on a moving conveyor belt to form cementitious foam boards or sheets, or transferred into a mold to make precast products with different shapes and surface profiles. Enough green strength for moving and handling can be achieved after 3-5 hours of curing. A desirable dry density of the cured cementitious foam material falls in the range of 2-35 pcf (32-560 kg/m$^3$) depending upon the requirements on insulating, fireproofing and mechanical performances. For all of the above applications, fiberglass scrim or mineral wool fabrics may be applied on the outer surfaces or embedded into the slurry body to enhance the mechanical properties of the final foamed cementitious products.

The foam may also be introduced to the slurry mixer 10 to prepare a foamed slurry matrix, and then the foamed slurry is pumped into the mixer 30 where the final blending with the lightweight aggregates will be accomplished. The mixing process may be operated in a rotary drum mixer, and the sequence of ingredient addition may be varied to fit for specific requirements.

EXAMPLE 1

Two foaming solutions were prepared according to formulations listed in Table 1, and then they were sent to the foam generator. After a stable froth flow was created, foam samples were collected for foam density verification. The results are also given in Table 1.

TABLE I

| | Weight % | |
|---|---|---|
| Component | Foam 1 | Foam 2 |
| Alkylpolyglycol ether[1] | 0.2 | — |
| Sodium phenyl sulfonate | — | 0.3 |
| Acrylic latex[2] | 0.1 | 0.06 |
| Water | 99.7 | 99.64 |
| Foam density, pcf (kg/m$^3$) | 5 (80) | 3 (48) |

[1]Surfonice air entraining agent from Huntsman
[2]Ucar Latex 163S from Dow Chemical

EXAMPLE 2

A series of sample compositions were prepared following formulas listed in Table 2 to demonstrate the effects of the phase change material on temperature holding and mechanical performance of the inventive materials.

TABLE 2

| | Sample I.D., Weight % | | | | | |
|---|---|---|---|---|---|---|
| Component | S1 | S2 | S3 | S4 | S5 | S6 |
| Calcium sulfate hemihydrates | 69.2 | 66 | 40 | 36 | 36 | 32 |
| Portland cement, Type 1 | — | — | 26 | 24 | 24 | 22 |
| Fly ash | — | — | — | 5 | — | 5 |
| Hydrated lime | — | — | — | 1 | — | 1 |
| Micronal PCM[1] | — | — | — | — | 6 | 6 |
| EPS foam beads | 2 | 2 | 2 | 2 | 2 | 2 |
| Acrylic latex[2] | — | 3.2 | 3.2 | 3.2 | 3.2 | 3.2 |
| Foam 2 (from Example 1) | 2.8 | 2.8 | 2.8 | 2.8 | 2.8 | 2.8 |
| Fiberglass[3] | 1.2 | 1.2 | 1.2 | 1.2 | 1.2 | 1.2 |
| Alcohol ethoxylate[4] | 0.1 | 0.1 | 0.1 | 0.1 | 0.1 | 0.1 |
| Magnesium hydroxide | 2.5 | 2.5 | 2.5 | 2.5 | 2.5 | 2.5 |
| Water reducer[5] | 0.2 | 0.2 | 0.2 | 0.2 | 0.2 | 0.2 |
| Water | 22 | 22 | 22 | 22 | 22 | 22 |

Figure 2:
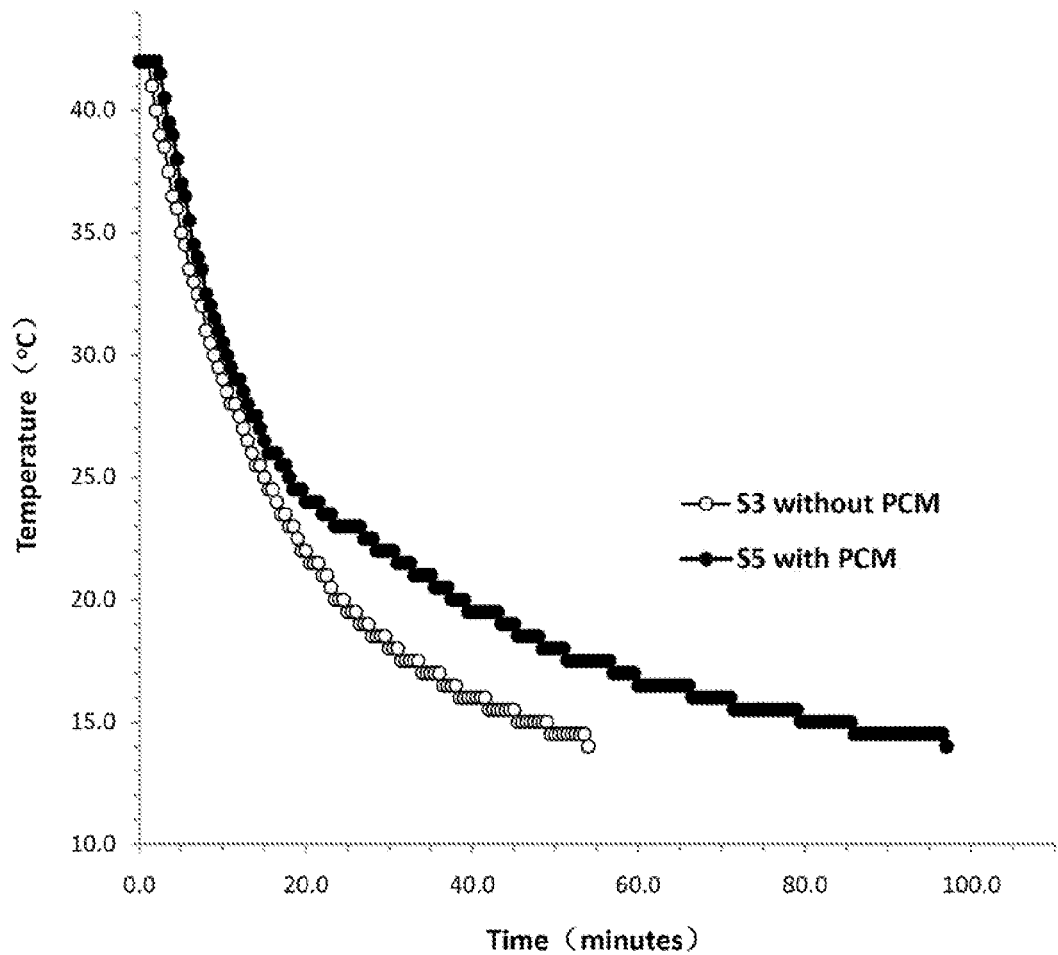
FIG. 2 is a graph showing cooling curves of embodiment boards made according to the inventive foamed cementitious compositions with and without phase change materials (PCM).

[1]Microencapsulated phase change material from BASF
[2]Ucar Latex 163S from Dow Chemical, 58% solid content
[3]chopped strand, 15 μm in diameter, 25 mm in length, from PPG Fiber Glass
[4]Empilane ® K surfactant from Huntsman
[5]sodium lignosulphonate from Lignotech The resulting slurry mixtures were cast into molds to make 1"×12"×30" (25×305×762 mm) cementitious foam boards. The boards were removed from the molds after 4 hours and cured for 7 days at room temperature. Specimens with a dimension of 1"×12"×12" (25×305×305 mm) were cut from each type of the sample boards. A hole with ⅛" (3 mm) in diameter and 6" (152 mm) in length for thermocouple embodiment was drilled from the middle of a cross section surface of the specimen boards. The specimens with embedded thermocouples were placed in an oven at 50° C. (122° F.) for 5 hours, and then immediately put into a refrigerator. The temperature inside the refrigerator was maintained at 12° C. (53.6° F.). Temperature changes of the specimens during cooling period were monitored and recorded by Thermocouple Data Loggers manufactured by Lascar Electronics. Cooling curves of sample S3 with no phase change materials, and sample S5 which contains about 6 wt % of the microencapsulated phase change material are illustrated in FIG. 2.

The microencapsulated phase change material used is Micronal PCM available from BASF, which has a melting point (phase change temperature) of 26° C. (78.8° F.). From FIG. 2, it can be seen that, without the PCM, temperature of sample S3 dropped quite rapidly. It took about 16.5 minutes for this sample to reduce its temperature from 26 to 18° C. (78.8 to 64.4° F.). Due to the presence of the PCM, the cooling speed of sample S5 had been significantly decreased after its temperature reached 26° C. (78.8° F.), the phase change point of the microencapsulated PCM. From this point, latent heat energy stored in the PCM started to release, and compensate the heat loss from the material to the cold environment. As a result, the temperature of the material could be maintained within a certain range for a longer period of time. About 33 minutes were needed to cool sample S5 from 26 to 18° C. (78.8 to 64.4° F.), which doubled the time needed for S3, indicating the energy saving potential and effectiveness of utilizing phase change materials in the insulating cementitious foams.

EXAMPLE 3

A number of 2"×12"×12" (50×305×305 mm) cementitious foam boards were prepared following the compositions listed in Table 2 from Example 2. The boards were removed from the molds after 4 hours and cured for 7 days at room temperature. Several 2" (51 mm) cubic specimens were taken from each type of the sample boards for compressive tests according to ASTM C 109. Dry densities of the samples were measured after 14 days room temperature cure. Thermal conductivity of each sample was determined using a KD2-Pro thermal property analyzer manufactured by Decagon Devices, Pullman, Wash. Water resistance tests were conducted by immersing the 2" cubic specimens in water for 1 hour, and then measuring weight gain, which is the increase in specimen weight before and after water immersion. Water absorption can be expressed in, terms of weight gain per unit surface area of a specimen. The results of property testing are summarized in Table 3.

TABLE 3

| | Sample I.D. | | | | | |
|---|---|---|---|---|---|---|
| Property[1] | S1 | S2 | S3 | S4 | S5 | S6 |
| Dry density, pcf (kg/m$^3$) | 15.1 (242) | 13.9 (223) | 15.5 (248) | 13.7 (219) | 14.8 (237) | 14.1 (226) |
| Compressive strength, psi (MPa) | 80 (0.55) | 93 (0.64) | 110 (0.76) | 152 (1.05) | 196 (1.35) | 202 (1.39) |

TABLE 3-continued

| Property[1] | Sample I.D. | | | | | |
|---|---|---|---|---|---|---|
| | S1 | S2 | S3 | S4 | S5 | S6 |
| Thermal conductivity, W/m · K | 0.06 | 0.06 | 0.07 | 0.06 | 0.06 | 0.06 |
| Water absorption, kg/m² | 1.35 | 1.1 | 0.69 | 0.76 | 0.58 | 0.72 |

[1]at least 5 measurements for each property and each sample group were conducted, standard deviations were within 10% of means As shown in Table 3, compressive strength of the cementitious foam materials consisting of gypsum-cement blends is dramatically increased by adding microencapsulated phase change materials. The microencapsulated PCM seems to show a more significant impact on mechanical property improvement of gypsum-cement systems than pozzolanic materials. The presence of the microencapsulated PCM may prevent the formation of ettringite and thaumasite, minimize interference reactions between gypsum hemihydrates and cement, and facilitate their independent hydrations. As a result, a more stable and compatible gypsum-cement blending system is created, which leads to a considerable increase in mechanical strength of the final products.

Low thermal conductivity is beneficial for achieving good insulation performance. Thermal conductivities of the inventive cementitious foams can be further decreased by reducing the density of the materials, but this will result in a reduction in mechanical properties. Among various embodiments of the present invention, thermal conductivities of the cementitious foams may vary from 0.05 to 0.12 W/m·K depending on specific mechanical strength requirements.

Samples containing polymer latex exhibit lower water absorption amounts than the formulation without latex indicating improved water resistance. Insulation materials with water absorption (1 hour water immersion) of less than 1.0 kg/m² are considered suitable for exterior use.

EXAMPLE 4

In order to demonstrate the effect of wood and natural fibers on fastener holding ability of the cementitious foam materials, a number of 2"×12"×12" (50×305×305 mm) cementitious foam boards were made according to the compositions given in Table 4.

TABLE 4

| Component | Sample I.D., Weight % | | |
|---|---|---|---|
| | S7 | S8 | S9 |
| Calcium sulfate hemihydrates | 24 | 22 | 20 |
| Portland cement, Type 1 | 36 | 33 | 30 |
| Pine wood flour[1] | — | 3 | 6 |
| Micronal PCM | 3 | 3 | 3 |
| EPS foam beads | 2 | 2 | 2 |
| Acrylic latex | 3.2 | 3.2 | 3.2 |
| Foam 2 (from Example 1) | 2.8 | 2.8 | 2.8 |
| Fiberglass | 1.2 | 1.2 | 1.2 |
| Alcohol ethoxylate | 0.1 | 0.1 | 0.1 |
| Magnesium hydroxide | 2.5 | 2.5 | 2.5 |
| Water reducer | 0.2 | 0.2 | 0.2 |
| Water | 25 | 27 | 29 |

[1]60 mesh particle size available from American Wood Fiber

The boards were removed from the molds after 4 hours and cured for 7 days at room temperature. Several 2" (51 mm) cubic specimens were prepared from each type of the sample boards for tensile testing of fastener pullout resistance. Coarse thread drywall screws (#6×1¼") with Phillips flat head were selected. The fastener was positioned in the center of the upper surface of the 2" cubic block, and inserted into the specimen by a DeWalt DEW-DW 255 electronic screwdriver using the same speed. The tensile tests for fastener pullout resistance were conducted by a Mark-10 tester, and results are given in Table 5. The pullout forces of expanded polystyrene (EPS) foam and gypsum wallboard were also tested for comparison purpose.

TABLE 5

| Property[1] | Sample I.D. | | | | |
|---|---|---|---|---|---|
| | EPS Foam | Gypsum Wallboard | S7 | S8 | S9 |
| Dry density, pcf (kg/m³) | 3.5 (56) | 70 (1121) | 15.7 (251) | 15.1 (242) | 14.6 (234) |
| Fastener pullout resistance, lbf | 5 | 21.5 | 16 | 20.5 | 22 |

[1]at least 5 measurements for each property and each sample group were conducted, standard deviations were within 10% of means The tensile testing results show that the fastener pullout resistance of cementitious foam samples was superior to that of EPS foam. The fastener holding capacity of the cementitious foams was improved by adding a small percentage of wood flour into the compositions. The foamed cementitious products demonstrate a fastener pullout resistance similar to gypsum wallboard, which indicates that such products are suitable and acceptable for mechanical installation.

EXAMPLE 5

The 2" cubic specimens prepared from the cementitious foam compositions of Example 2 and Example 4 were selected to conduct fireproofing and high temperature resistance tests. The specimens were exposed to 800-1000° C. (1472-1832° F.) natural gas flame, and also placed in a high temperature oven operated at 850° C. (1562° F.). After 3 hours exposure, the specimens were removed from the heat sources and observed for structural change. The result shows that all of the cementitious foam specimens have maintained their structural integrity with no degradation and decomposition of cementitiou matrix being detected, such as collapse, cracks or penetrating holes.

What is claimed is:
1. A thermal energy storage foamed cementitious composition, comprising:
(a) a cementitious binder mixture of calcined gypsum and hydraulic cement, in an amount of about 30-80 wt %;
(b) a phase change material, in an amount of up to about 30 wt %;
(c) lightweight aggregates, in an amount of about 0.5-30 wt %;
(d) a polymer latex, in an amount of about 0.5-15 wt %; and
(e) a foaming solution, in an amount of about 0.5-25 wt %, wherein said foaming solution comprises about 0.05-10 wt. % of a foaming agent selected from the group con- sisting of polyoxyethylene alkyl ether, alkanol sulfate and protein, and about 0.02-1.5 wt. % of said polymer latex.

2. The composition of claim 1, wherein said cementitious binder mixture comprises said calcined gypsum and said hydraulic cement in a weight ratio range from about 1:3 to about 3:1.

3. The composition of claim 1, wherein said calcined gypsum is calcium sulfate hemihydrate.

4. The composition of claim 1, wherein said hydraulic cement is Portland cement.

5. The composition of claim 1, wherein said phase change material is selected from the group consisting of microencapsulated, macroencapsulated, impregnated, and absorbed phase change particles.

6. The composition of claim 1, wherein said phase change material is a microencapsulated phase change material having a thermosetting polymer shell.

7. The composition of claim 1, wherein said lightweight aggregates are expanded polystyrene foam beads.

8. The composition of claim 1, wherein said lightweight aggregates are expanded perlite particles.

9. The composition of claim 1, wherein said lightweight aggregates comprise up to about 20 wt % wood flour.

10. The composition of claim 1, wherein said polymer latex is a water-based acrylic latex.

11. The composition of claim 1, wherein said polymer latex is an epoxy emulsion.

12. The composition of claim 1, further comprising at least one of the group consisting of:
(f) about 0.2-5 wt % of a reinforced fiber;
(g) about 0.05-0.3 wt % of a surfactant; and
(h) up to about 15 wt % of an inorganic flame retardant.

13. The composition of claim 12, wherein said reinforced fiber is chopped fiberglass.

14. The composition of claim 12, wherein said surfactant is selected from the group consisting of alcohol ethoxylate, and perfluorosulfonate.

15. The composition of claim 12, wherein said inorganic flame retardant is selected from the group consisting of aluminum trihydrate, and magnesium hydroxide.

16. The composition of claim 1, further comprising one or more additives selected from the group consisting of gypsum retarder, water reducer, antifreeze, and antibacterial agent, scrim, and combinations thereof.

* * * * *